United States Patent [19]
Suzuki et al.

[11] Patent Number: 5,151,982
[45] Date of Patent: Sep. 29, 1992

[54] DATA PROCESSING SYSTEM

[75] Inventors: Shohei Suzuki, Tachikawa; Isao Sakuma, Oome, both of Japan

[73] Assignee: Kabushiki Kaisha Toshiba, Kawasaki, Japan

[21] Appl. No.: 329,210

[22] Filed: Mar. 27, 1989

[30] Foreign Application Priority Data

Mar. 30, 1988 [JP] Japan .................. 63-76942
Apr. 8, 1988 [JP] Japan .................. 63-85431

[51] Int. Cl.$^5$ ............................................ G06F 12/08
[52] U.S. Cl. ........................... 395/425; 364/DIG. 1; 364/243; 364/243.41; 364/243.4; 364/254; 364/254.3; 364/256.3
[58] Field of Search ... 364/200 MS File, 900 MS File; 395/400, 425

[56] References Cited

U.S. PATENT DOCUMENTS

| | | | |
|---|---|---|---|
| 4,805,098 | 2/1989 | Mills, Jr. et al. | 364/900 |
| 4,811,215 | 3/1989 | Smith | 364/200 |
| 4,872,138 | 10/1989 | Ciacci | 364/200 |
| 4,912,626 | 3/1990 | Fiacconi | 364/200 |
| 4,916,301 | 4/1990 | Mansfield et al. | 364/521 |
| 4,937,791 | 6/1990 | Steele et al. | 365/230.01 |

Primary Examiner—Stuart S. Levy
Assistant Examiner—Rebecca L. Rudolph
Attorney, Agent, or Firm—Cushman, Darby & Cushman

[57] ABSTRACT

A data processing system comprises a main memory for receiving an input access virtual address, data, and a write instruction, converting the access virtual address into a real address, storing the data at the real address in accordance with the write instruction, and generating a response upon writing of the data; an execution section for selectively and sequentially executing a series of microinstructions in accordance with an input wait signal, generating a write instruction and an access virtual address upon execution of a write microinstruction, and outputting the write instruction, the access virtual address, and the data to the main memory; and a controller for generating a wait signal in accordance with the access virtual address and the write instruction from the execution section, and the response from the main memory, and outputting the wait signal to the execution section.

7 Claims, 6 Drawing Sheets

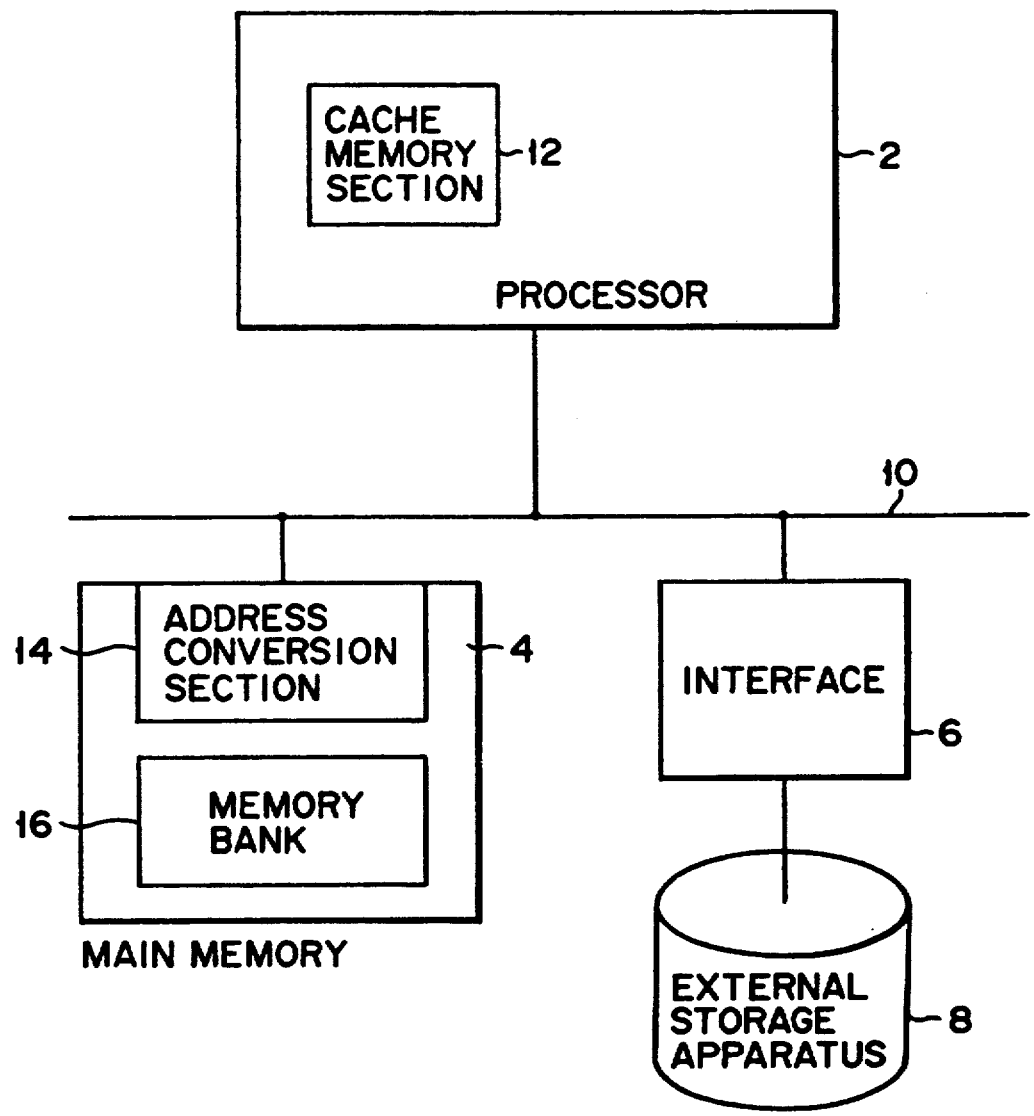
F I G. 1

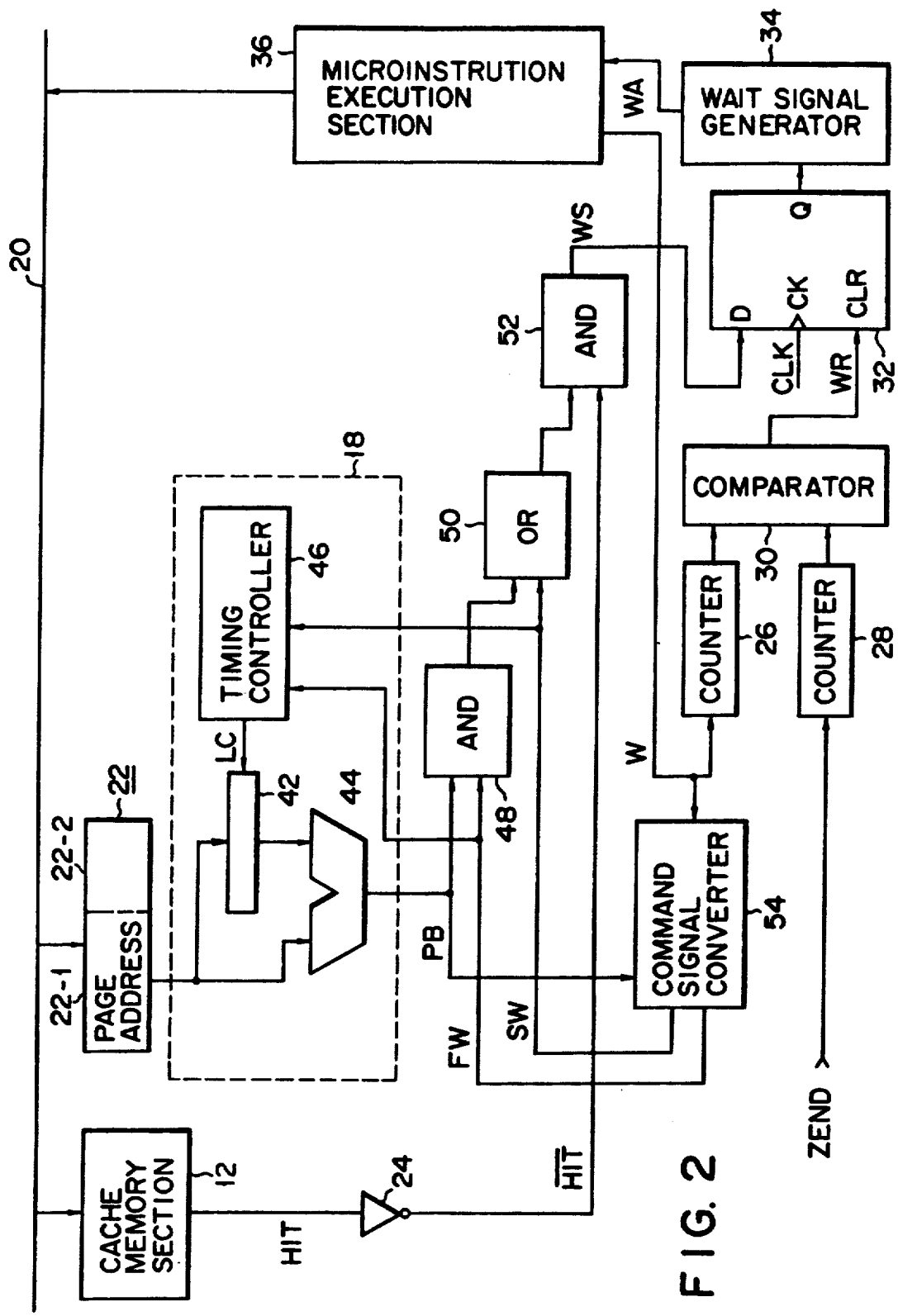
F I G. 2

DATA PROCESSING SYSTEM

BACKGROUND OF THE INVENTION

1. Field of the Invention

The present invention relates to a data processing system having a cache memory and an address converter for converting a virtual address into a real address in a main storage apparatus and, more particularly, to a data processing system capable of executing a microinstruction subsequent to a write microinstruction without a wait time, even when a cache hit does not occur during execution of the write microinstruction.

2. Related Art of the Invention

Conventional data processing systems, whether comprising a main storage apparatus having a relatively small capacity as a storage apparatus having a relatively large capacity, both employ a virtual storage scheme. In this scheme, a virtual address is converted into a real address by an address conversion section positioned in the main storage apparatus. Generally, a processor in such a data processing system incorporates a cache memory section of a store-through scheme.

In such a data processing system, when a read microinstruction is executed and a miss-hit occurs in the cache memory, a virtual address is converted into a real address, and data is read out from the real address in the main storage apparatus into the processor. If a real address is not present in the main storage apparatus, a missing page signal is supplied to the processor. After the execution of the read microinstruction, therefore, the processor must withhold execution of the next microinstruction until the data or the missing page signal is input.

When a write microinstruction is to be executed, the processor can sometimes execute the next microinstruction without waiting for a response from the main storage apparatus. If, however, a real address corresponding to a virtual address is not present in the main storage apparatus, data cannot be written in the main storage apparatus. In this case, write processing is temporarily stopped, and an external storage apparatus must be accessed. When a microinstruction is to be executed immediately after the execution of the write microinstruction, some microinstructions may have been executed by the time a missing page signal is supplied to the processor. In this case, the processor must be returned to its original state, and hence requires complicated hardware.

For this reason, the conventional data processing system employs a scheme wherein after a write microinstruction is executed, execution of a subsequent microinstruction is delayed until a write end response or a missing page signal is supplied from the main storage apparatus. In such a scheme, however, since a wait occurs for each execution of a write microinstruction, the processing speed is decreased.

SUMMARY OF THE INVENTION

The present invention has been devised in consideration of the above-described situation; and sets forth to provide a method and data processing system therefore, of processing a write microinstruction at high speed even when a cache hit does not occur.

In order to achieve the above object, a data processing system comprises a main memory for receiving an input access virtual address, data, and a write instruction which converts the access virtual address into a real address, thereby storing the data at the real address in accordance with the write instruction as well as generating a response upon write operation of the data; an execution section for selectively and sequentially executing a series of microinstructions in accordance with an input wait signal, generating a write instruction and an access virtual address upon execution of a write microinstruction as well as outputting the write instruction, the access virtual address, and the data to the main memory; and a controller for generating a wait signal in accordance with the access virtual address and the write instruction from the execution section, the response from the main memory when it is not certain that the real page is present in the main memory, as well as outputting the wait signal to the execution section.

In order to achieve the above object, a method of processing a write microinstruction at high speed comprises generating a write instruction and an access virtual address when a write microinstruction is executed, converting the access virtual address into a real address; storing data at the real address in a main memory in accordance with the write instruction; generating a response upon write operation of the data; generating a wait signal in accordance with the access virtual address, the write instruction, and the response when it is not ensured that the real address is present in the main memory; and selectively awaiting execution of a microinstruction subsequent to the write microinstruction in response to the wait signal.

According to the present invention described above, even if a "miss-hit" occurs in the cache memory, if the presence of a corresponding page in the main storage apparatus is certain, the next microinstruction can be immediately executed. Furthermore, the data processing system can be designed such that in a continuous write operation, execution of a subsequent microinstruction is delayed only when a new page is opened. In a continuous write operation within a single page, execution of a subsequent microinstruction need not be delayed, and hence the processing speed can be increased.

BRIEF DESCRIPTION OF THE DRAWINGS

FIG. 1 is a block diagram showing an arrangement of a data processing system of the present invention;

FIG. 2 is a block diagram showing an internal arrangement of a processor shown in FIG. 1 according to a first embodiment;

DETAILED DESCRIPTION OF THE PREFERRED EMBODIMENTS

Figure 3:
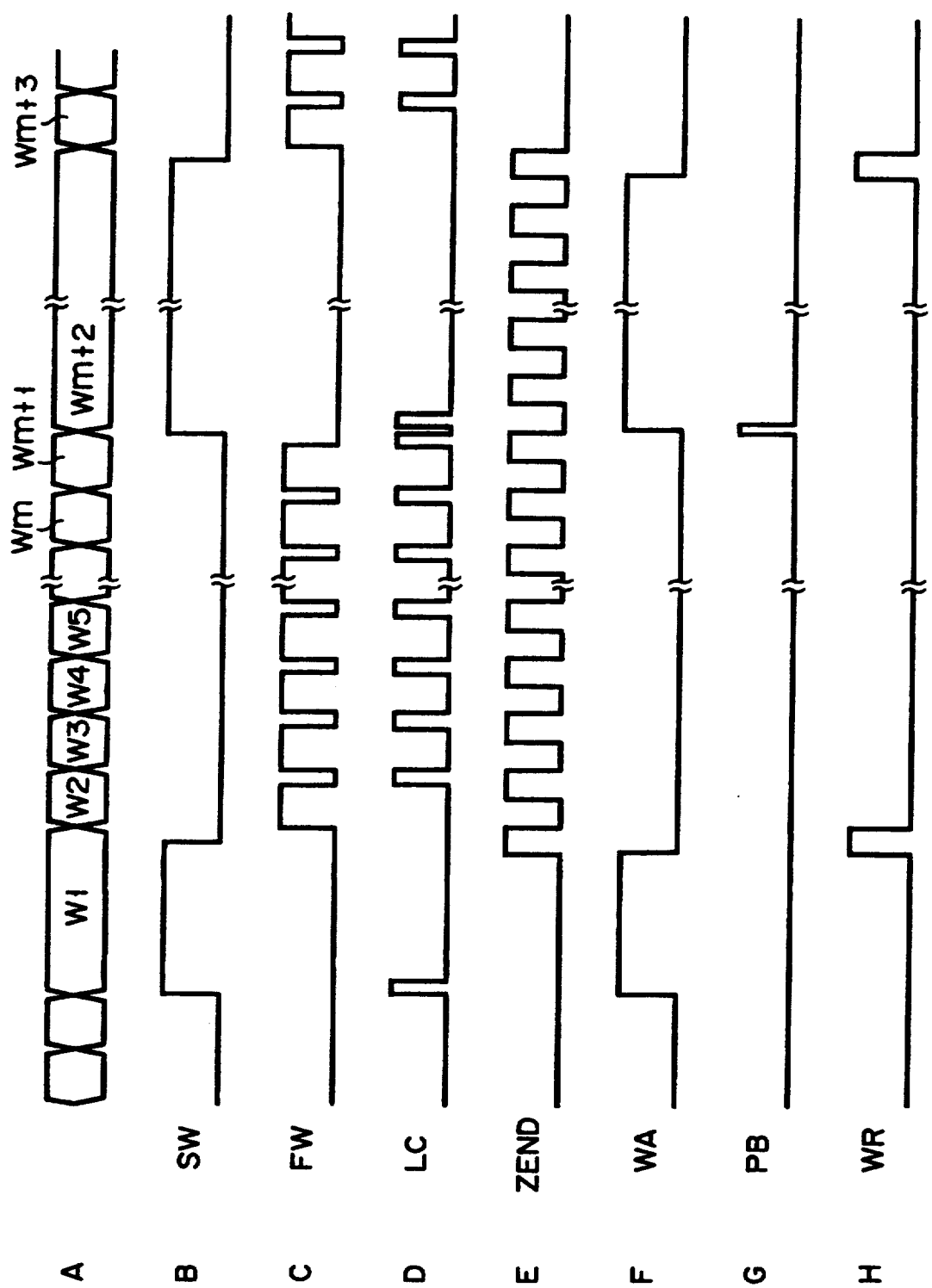
FIGS. 3A to 3H are timing charts for explaining an operation of the processor in FIG. 1.

A data processing system according to the present invention will be described in detail below with reference to the accompanying drawings.

An arrangement of the data processing system according to the present invention will be described with reference to FIG. 1 first.

A processor 2 is connected to a main memory 4 through a system bus 10. An external storage apparatus 8 is connected to the system bus 10 through an interface 6. The processor 2 incorporates a cache memory section 12. The cache memory section 12 generates a hit signal HIT representing that a cache memory hit or miss-hit occurs when the memory 4 is accessed. The memory 4 comprises an address conversion section 14 for converting a virtual address into a real address and a memory bank 16 for storing data. When a write microinstruction is executed by the processor 2, the memory 4 checks whether a real address designated by a given virtual address is present therein by referring to a page table (not shown). If the real page is present, the memory 4 supplies a write end response ZEND to the processor 2 upon completion of the write processing. If the real page is not present, the memory 4 supplies a missing page signal to the processor 2 at the same time as that of the write end response.

An arrangement of the processor 2 according to a first embodiment will be described below with reference to FIG. 2.

The processor 2 includes a microinstruction execution section 36. The execution section 36 generates a write instruction signal W and a virtual address when a write microinstruction is to be executed. The virtual address is output onto an address bus 20 of the system bus 10. The cache memory section 12 generates the signal HIT in accordance with the virtual address on the bus 20 in the above-described manner. A register 22 holds the virtual address output onto the bus 20. A virtual page address of the virtual address is held in a register portion 22-1 of the register 22, and an intrapage address of the virtual address is held in a register portion 22-2. The held virtual page address is supplied to a page boundary detector 18.

The detector 18 comprises a register 42, a comparator 44, and a timing controller 46. The controller 46 generates a latch control signal LC in accordance with a start write instruction signal SW or a subsequent write instruction signal FW to be input. The register 42 holds the virtual page address of the register portion 22-1 in response to the signal LC. When the signal SW is active, the virtual page address held in the register portion 22-1 is latched at the start of a machine cycle. When the signal FW is active, it is latched at the end of the machine cycle. The currently latched virtual page address is held until then. The virtual page address held in the register 42 is output to one input terminal of the comparator 44. The virtual page address in the register 22-1 is supplied to the other input terminal of the comparator 44. If the virtual page addresses input to both input terminals do not coincide with each other, the comparator 44 generates a page boundary detection signal PB set at logic "1".

A command signal converter 54 selectively generates the signals SW and FW in accordance with the the signal W from the execution section 36 and the signal PB from the detector 18. When a series of write microinstructions is to be executed, when the start write microinstruction is executed, or a page boundary is detected by the detector 18, the signal SW is output. In execution of the second and subsequent microinstructions, the signal FW is output with respect to a write microinstruction for which a page boundary is not detected.

An AND gate 48 receives the signal PB from the detector 18 and the signal FW from the converter 54. An output from the AND gate 48 is supplied to an OR gate 50. The OR gate 50 also receives the signal SW from the converter 54. An output from the OR gate 50 is supplied to an AND gate 52. The signal HIT from the cache memory section 12 is inverted by an inverter 24. The inverted signal $\overline{HT}$ is also supplied to the AND gate 52. An output from the AND gate 52 is supplied to the D input terminal of a D flip-flop (F/F) 32 as a wait setting signal WS. A clock signal CLK is supplied to a clock terminal CK of the F/F 32. The F/F 32 is set by the wait setting signal SW in synchronism with the clock signal.

The signal W from the execution section 36 is supplied to and is counted by a counter 26. The count value is supplied to a comparator 30. The write end signal ZEND representing the end of write processing is supplied from the main memory 4 to a counter 28 to be counted. The count value of the counter 28 is supplied to the comparator 30. The comparator 30 compares the count values from the counters 26 and 28, and supplies a wait release signal to a clear terminal CLR of the F/F 32 when they coincide with each other. With this operation, the F/F 32 is reset. That is, when write end signals ZEND are received with respect to all the executed write microinstructions, the wait release signal WR is output to the F/F 32. The Q output of the F/F 32 is supplied to a wait signal generator 34 as a wait control signal. The generator 34 generates a wait signal WA for controlling execution of a microinstruction by the execution section 36.

An operation of the first embodiment will be described below with reference to FIGS. 3A to 3H.

Assume that a series of microinstructions is to be executed by the execution section 36. The signal W is output to the converter 54 in accordance with execution of a start write microinstruction W1. At the same time, a virtual address to be accessed is output onto the bus 20. The virtual address is latched in the register 22. In addition, the cache memory section 12 checks whether a "cache hit" occurs in accordance with the virtual address on the bus 20, and outputs the signal HIT.

When the "cache hit" occurs, the signal HIT is set at logic "1". Therefore, an output from the AND gate 52 is set at logic "0", and the F/F 32 is not set.

A case wherein the "cache hit" does not occur, i.e., a miss-hit occurs, will be described below.

In response to the signal W corresponding to the execution of the start write microinstruction W1, the converter 54 outputs the signal SW to the OR gate 50 and the controller 46. In response to the signal SW, the controller 46 generates a latch control signal LC, as shown in FIG. 3D. A virtual page address is latched in the register 42 in response to the latch control signal LC. The virtual page address is held in the register 42 until the next latch control signal is input. The virtual page address is also supplied from the register portion 22-1 to the comparator 44. Therefore, both the addresses coincide with each other, and the signal PB is set at logic "0". As a result, an output from the AND gate 48 is set at logic "0". However, an output from the OR gate 50 is set at logic "1" because of the signal SW. In addition, the signal HIT is set at logic "1", and the wait setting signal WS is output from the AND gate 52 to the F/F 32. The Q output of the F/F 32 is set at logic "1", and a wait signal WA is output from the generator 34 to the execution section 36. With this operation, the execution section 36 waits for execution of the next microinstruction until the signal WA is set at logic "0".

This response occurs because a real page corresponding to the virtual address is not always present in the memory 4. In such a case, an unnecessary real page or a real page with a low frequency of use is stored in the external storage apparatus 8, and a real page corresponding to the start write microinstruction is read out from the apparatus 8 to be stored in the memory 4. At this time, a page table (not shown) in the memory 4 is updated. Subsequently, in this embodiment, execution of the microinstructions is started from the start write microinstruction.

In this case, the count value of the counter 26 is incremented by "1" in response to the signal W, and is set to be "138". When the signal ZEND from the main memory 4 is input, the count value of the counter 28 is incremented by "1", and is set to be "1". As a result, the wait release signal WR is output from the comparator 30, as shown in FIG. 3H. With this operation, the F/F 32 is reset, and the Q output is set at logic "0". As a result, the wait signal WA is not output from the generator 34, and hence the execution section 36 can execute the next write microinstruction.

When the second and subsequent write microinstructions W2, W3, ..., are to be executed, the signal SW is not output from the converter 54, but the signal FW set at logic "1" is output, as shown in FIG. 3C. A virtual page address of a virtual address associated with the second write microinstruction W2 is supplied to the comparator 44. In addition, the virtual page address held in the register 42 is supplied to the comparator 44. When the virtual addresses represent addresses in a single page, the signal PB is set at logic "0". Therefore, an output from AND gate 48 is the logic "0", and the wait setting signal WS is set at logic "0". Since the F/F 32 is not set, the execution portion 36 can execute the second and subsequent write microinstructions without a wait time. In response to the signal FW, the controller 46 generates the latch control signal LC for the next write microinstruction W3 as shown in FIG. 3D upon completion of the currently executed write microinstruction W2. The register 42 latches the virtual page address held in the register portion 22-1 in response to the signal LC.

In execution of the second and subsequent write microinstructions Wm+2, when a new page is opened, the signal PB from the comparator 44 is set at logic "1", as shown in FIG. 3G. The converter 54 generates the signal SW in place of the signal FW in accordance with the signal PB, as shown in FIG. 2B. In response to the signal SW, the controller 46 generates the signal LC, and the virtual page address held in the register portion 22-1 is held in the register 42. The comparator 30 waits for the signal ZEND until the count of the counter 28 becomes the same as that of the counter 26. Thereafter, the comparator 30 outputs the release signal to the F/F 32. Subsequently, these microinstructions are processed in the same manner as in the execution of the start microinstruction W1.

In the first embodiment, when a page boundary is detected, the signal SW is output from the converter 54 in response to the signal PB. However, the signal FW need not be output. In this case, the signal PB need not be supplied to the converter 54. In addition, the detector 18 may detect a page boundary when an intrapage address of a virtual address becomes "0".

Figure 4:
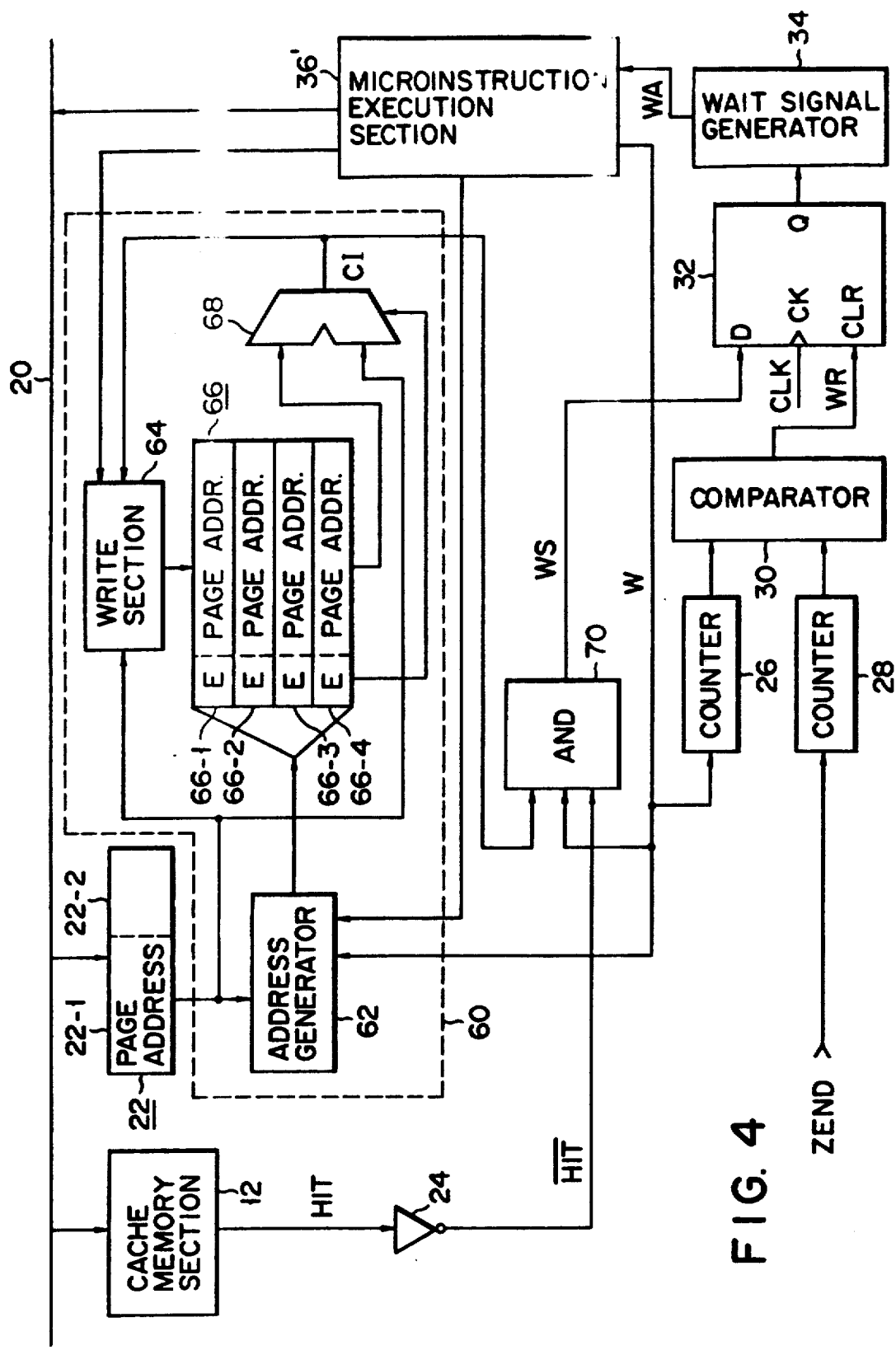
FIG. 4 is a block diagram showing an internal arrangement of the processor shown in FIG. 1 according to a second embodiment.

A data processing system according to a second embodiment of the present invention will be described below with reference to FIG. 4. The same reference numerals in the second embodiment denote the same parts as in the first embodiment, and a description thereof will be omitted.

A virtual page address held in a register portion 22-1 is output to a page recognizing section 60. The section 60 comprises an address generator 62, a write section 64, an address register group 66, and a comparator 68. The address register group 66 is comprised of four address registers 66-1 to 66-4, each of which stores an effective bit E and a virtual page address. Each effective bit represents whether a corresponding virtual page address is effective. The lower two bits of the virtual page address held in the register portion 22-1 are supplied to the address generator 62. The generator 62 decodes the lower two bits in response to a signal W or an address output command from an execution section 36', so as to generate an address for designating one address register of the address register group 66 and output the address thereto.

The comparator 68 compares the virtual page address read out from the address register designated by the address from the generator 62 with the virtual page address from the register portion 22-1 in response to the corresponding effective bit E of logic "1", and outputs a signal CI. When the bit E is set at logic "0" or when the two virtual page addresses do not coincide with each other, the signal CI is set at logic "1". When the bit E is set at logic "1" and the virtual page addresses coincide with each other, the signal CI is set at logic "0".

The write section 64 receives the virtual page address held in the register portion 22-1, and writes it together with the effective bit of logic "1" in the address register designated by the generator 62 in response to the signal CI of logic "1". In response to an effective bit reset command from the execution section 36', the write section 64 resets the effective bit E stored in the address register designated by the generator 62 at logic "0". The signal CI from the comparator 68, a signal $\overline{HT}$ from an inverter 24, and a signal W are supplied to an AND gate 70, and their logical product is calculated. The calculation result is supplied to the D input terminal of an F/F 32 as a wait setting signal WS.

The execution section 36' executes a write microinstruction. When a corresponding virtual page is not present in a main memory 4, the execution section 36' stops a write operation in response to a missing page signal from the memory 4. When a page corresponding to the virtual page address is read out from an external storage apparatus 8 into the memory 4, the section 36' executes the write microinstruction again. In addition, when an instruction for updating a page table (not shown) in the memory 4, such as a roll-out instruction, is executed, the section 36' generates an effective bit reset command and an address output command, and outputs them to the generator 62 and the write section 64, respectively.

Figure 5:
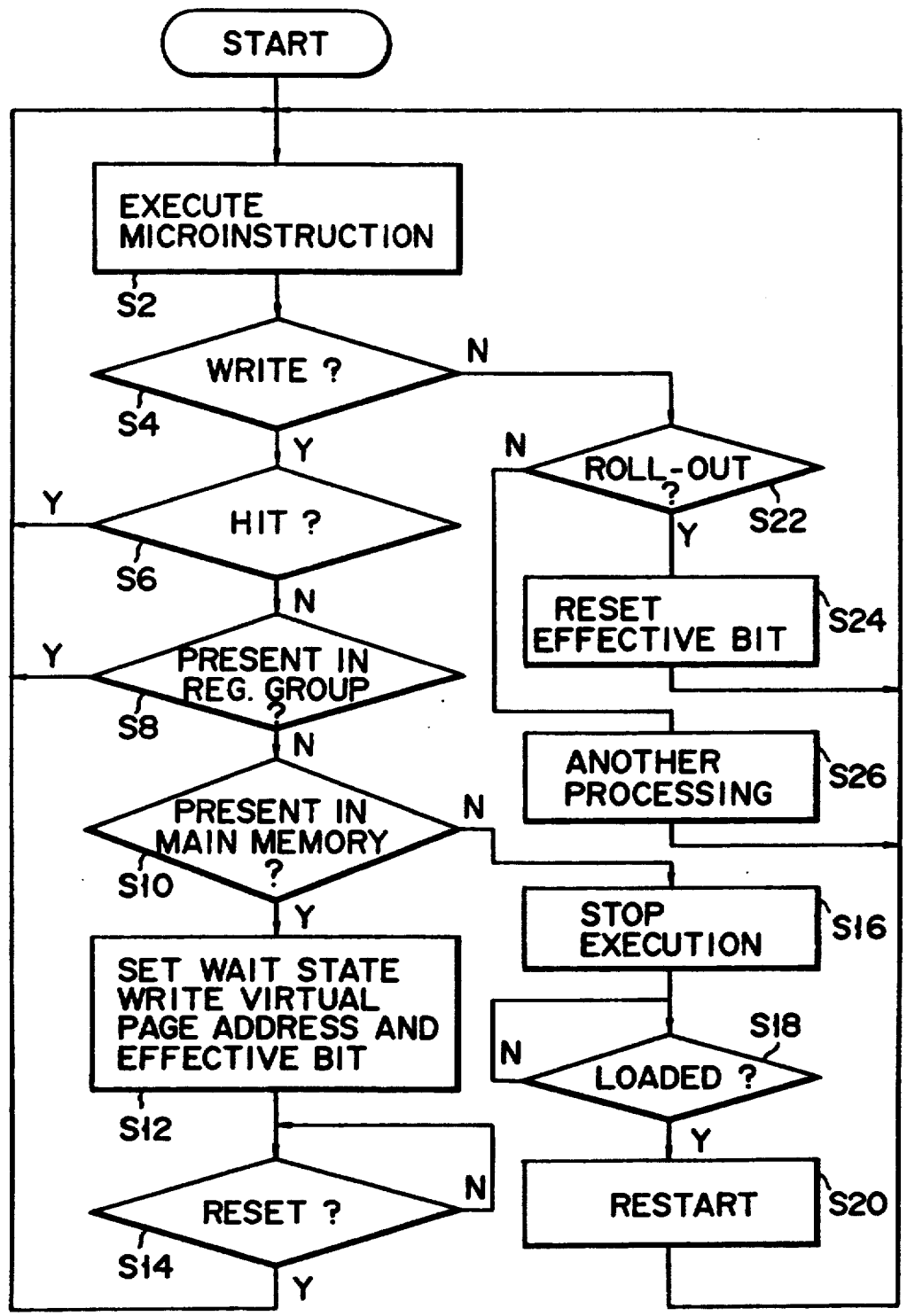
FIG. 5 is a flow chart for explaining an operation of the processor in FIG. 4.

An operation of the second embodiment will be described below with reference to FIG. 5.

When a microinstruction is executed in step S2, it is checked in step S4 whether the microinstruction is a write microinstruction. If Y in step S4, a virtual address is output onto a bus 20, and the signal W is output to the generator 62, an AND gate 70, and a counter 26. In step S6, it is checked whether a cache hit occurs. If Y in step S6, an output $\overline{HIT}$ from an inverter 24 is set at logic "0", and the signal WS is also set at logic "0", and the signal WS is also set at logic "0". As a result, an F/F 32 is not set, and the flow returns to step S2, thus executing the next microinstruction.

When a cache memory miss-hit occurs, the output $\overline{HIT}$ from the inverter 24 is set at logic "1", and it is determined in step S6 that the cache memory is miss-hit. In this case, the generator 62 decodes the lower two bits of a virtual page address from the register portion 22-1 so as to generate an address, and outputs it to the register group 66. The virtual page address is supplied to the write section 64. When the lower two bits of the virtual address are "01", the effective bit E and the virtual page address held in the register 66-2 are output to the comparator 68. If the virtual page address read out from the register 66-2 coincides with that from the register portion 22-1, and the effective bit E is set at logic "138", the signal CI of logic "0" is output. As a result, the wait setting signal WS is not output from the AND gate 70. Therefore, Y is obtained in step S8, and the flow returns to step S2, thus executing the next microinstruction without a wait time.

If the virtual page address read out from the register 66-2 and that from the register portion 22-1 do not coincide with each other, or if the effective bit E is set at logic "0", the signal CI of logic "1" is output. As a result, the wait setting signal WS is output from the AND gate 70 in step S12, and the F/F 32 is set. The execution section 36' waits for execution of the next microinstruction until the F/F 32 is reset in step S14, i.e., a signal ZEND is input from the memory 4. In response to the signal CI, the write section 64 writes the virtual page address from the register portion 22-1 as well as the effective bit E of logic "1" in the register 66-2. During this time period, a write operation of data is performed in the memory 4. If a real page corresponding to the virtual address is not present in the memory 4, N is determined in step S10, and hence step S16 is executed. In step S16, the execution of the microinstruction is stopped, and the processing is delayed in step S18 until a corresponding real page is read out from the external storage apparatus 8 into the main memory 4. When the read operation is completed, the processing is resumed from a microinstruction the execution of which is stopped in step S20.

If it is determined in step S22 that an instruction to be executed by the execution section 36' is a rollout instruction, an address output command is supplied to the generator 62. In response to the address output command, the generator 62 designates one address register of the register group 66. In addition, a reset command is output from the execution section 36' to the write section 64. In response to the reset command, the write section 64 resets the effective bit E stored in the designated register at logic "0".

The effective bit E is used in this embodiment. However, it is apparent that the write section 64 can reset the virtual page address stored in the designated register in response to the reset command without the effective bit by using the same arrangement.

Furthermore, in the first embodiment, the AND gates 48 and 52, and the OR gate 50 are used. However, as in the second embodiment, a single AND gate may be used. In this case, the converter 54 is omitted, and the signal W, the signal HIT, and the signal PB from the execution section 36 are supplied to the AND gate. In this case, the controller 46 generates a latch control signal in response to the signal W, as in the first embodiment.

Figure 6:
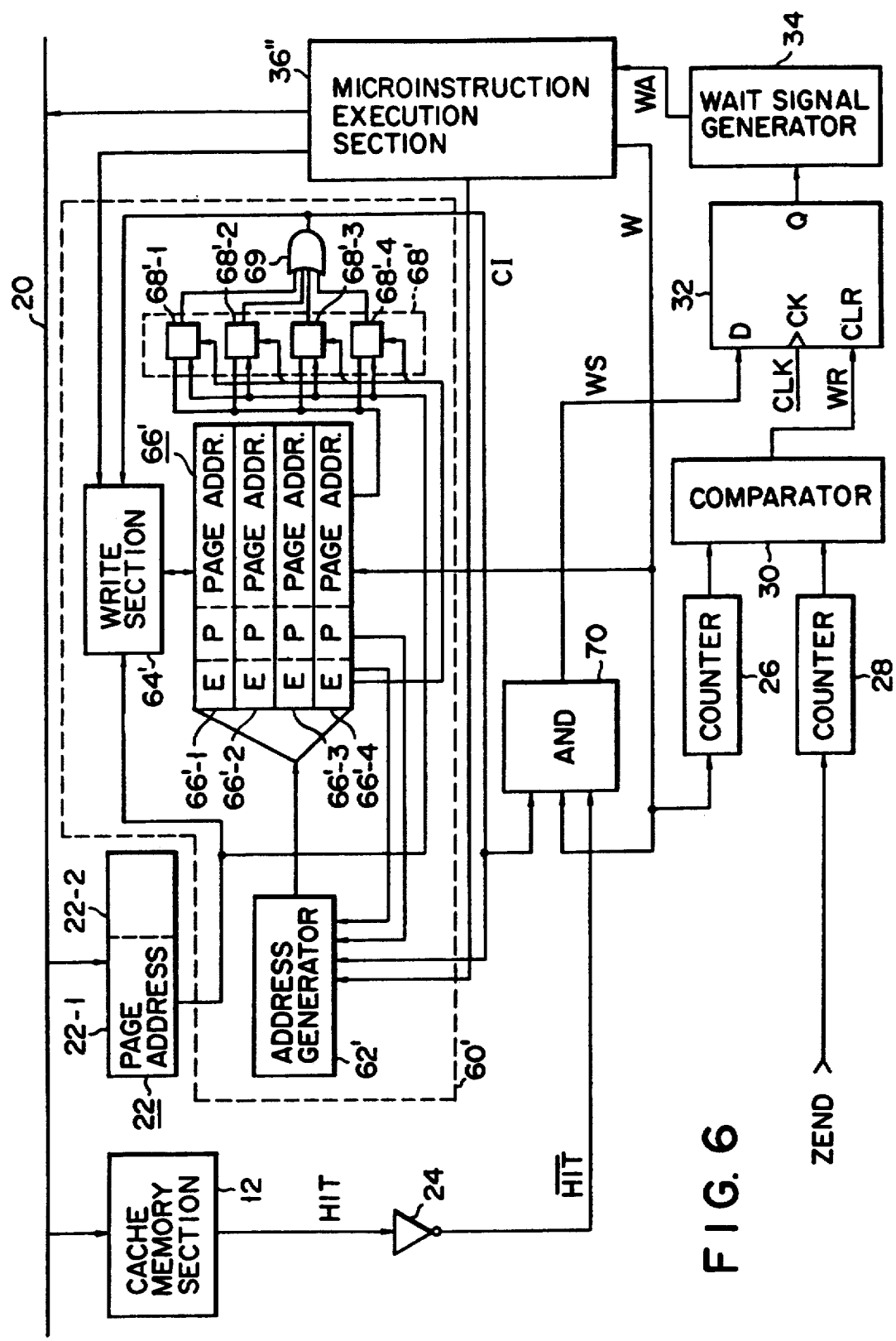
FIG. 6 is a block diagram showing an internal arrangement of the processor shown in FIG. 1 according to a third embodiment.

A data processing system according to a third embodiment of the present invention will be described in detail below with reference to FIG. 6. The reference numerals in the third embodiment denote the same parts as in the first and second embodiments, and a description thereof will be omitted.

A virtual page address held in a register portion 22-1 is output to a page recognizing section 60'. The section 60' comprises an address generator 62', a write section 64', an address register group 66', and a comparator group 68'. The address register group 66' comprises four address registers 66'-1 to 66'-4, each of which stores an effective bit E, a priority P, and a virtual page address. Each effective bit whether a corresponding virtual page address is effective. The priority P represents the reference frequency of the virtual page address. The virtual page address held in the register portion 22-1 is supplied to comparators 68'-1 to 68'-4 of the comparator group 68'. In response to a signal W from an execution section 36", the registers 66'-1 to 66'-4 of the register group 66' respectively output the virtual page addresses and the effective bits E to the comparators 68'-1 to 68'-4.

Similar to the second embodiment, each comparator compares the virtual page address read out from a corresponding register with the virtual page address from the register portion 22-1 in response to the a comparison signal. The comparison signals are input to an OR gate 69, and a signal CI is output. When the bit E is set at logic "0" or when the virtual page addresses do not coincide with each other, the comparison signal from each comparator is set at logic "1". When the bit E is set at logic "1" and the virtual page addresses coincide with each other, the comparison signal is set at logic "0".

In response to the signal CI from the OR gate 69, the address generator 62' reads out the effective bit E and the priority P from each register. In accordance with these data, one register of the register group 66' is designated. If one of the readout effective bits E is set at logic "0", an address for designating a register associated with that effective bit E is generated. If all the readout effective bits are set at logic "1", an address for designating a register associated with the lowest priority P of the readout priorities is generated. Upon reception of an address output command from the execution section 36", the address generator 62' generates an address for designating a register in accordance with the command.

The write section 64' receives the virtual page address held in the register portion 22-1, and writes the virtual page address together with the effective bit E of logic "1" and the lowest priority P in the register designated by the generator 62' in response to the signal CI of logic "1". Thereafter, the priorities stored in the remaining registers are incremented by one. In response to an effective bit reset command from the execution section 36", the write section 64' resets the effective bit E stored in the address register designated by the generator 62' at logic "0".

When the execution section 36" executes an instruction for updating a page table (not shown) in a memory 4, such as a roll-out instruction, it generates an effective bit reset command and an address output command, and outputs them to the generator 62' and the write section 64', respectively.

What is claimed is:

1. A system with a cache memory for executing a series of write microinstructions at high speed, comprising:

memory means, including a main memory for storing data and a cache memory, said cache memory being accessed at a higher speed than said main memory and storing a copy of data stored in said main memory;

execution means for receiving a series of write microinstructions, generating an access virtual address including a page address and a write instruction signal, and writing data to said memory means;

miss-hit discrimination means for discerning whether or not a page indicated by the virtual address output from said execution means is present in said cache memory and for generating a miss-hit signal representing a cache miss-hit when the page is not present;

detection means for detecting whether or not a virtual address, generated by said execution means and associated with a currently executed write microinstruction, represents a new page not addressed by the previously executed write microinstruction, and generating the resulting detection signal;

wait means for causing said execution means to wait before executing the currently executed write microinstruction when a new page is indicated and a miss-hit of the cache memory occurs, all in response to the miss-hit signal and the detection signal representing the new page;

said detection means comprising:

holding means for holding a page address generated for a new write microinstruction before the current write microinstruction is executed, and comparing means for comparing the page address held in said holding means with a page address generated for the currently executed write microinstruction, and generating a signal in accordance with the comparative result; and said wait means including:

an instruction convertor for generating a first signal indicative of an initial write microinstruction and a second signal indicative of subsequent write microinstructions, in response to the write instruction signal supplied from said execution means, AND circuit for outputting an output signal of the second signal and the signal supplied from said comparing means, an OR circuit for outputting a signal from said AND circuit and the first signal, a second AND circuit for outputting a signal from said OR circuit and a miss-hit signal, and setting means for setting said execution means in a wait state in response to a signal output from said second AND circuit.

2. A system with a cache memory for executing a series of write microinstructions at high speed, comprising:

memory means, including a main memory and a cache memory, for storing data;

execution means for receiving a series of write microinstructions, supplying a virtual address including a page address and data to said memory means in response to the series of write microinstructions, thereby writing the data to said memory means, and generating a write instruction signal when the write microinstructions are executed;

miss-hit discrimination means for discriminating whether a page indicated by the virtual address output from said execution means is present in said cache memory and for generating a miss-hit signal representing a cache miss-hit when the page is not present;

detection means for detecting whether a current page, indicated by an access virtual address supplied by the execution means and associated with a currently executed write microinstruction, differs from the previous page indicated by the virtual address prior to the access virtual address, and generating the resulting detection signal; and wait means for causing said execution means to wait before executing the write microinstructions in response to the miss-hit signal and a positive detection signal indicating different page addresses said wait means including an instruction converter for generating a sequential signal indicative of write microinstructions subsequent to the first write microinstruction in response to the write instruction signal supplied from said execution means, and setting means for setting said execution means in a wait state in response to the sequential signal, the detection signal, and the miss-hit signal when the currently executed write microinstruction is one of the write microinstructions subsequent to the first write microinstruction and the page indicated by the virtual address associated with the currently executed write microinstruction is not present in the cache memory and when a new page is indicated by the virtual address.

3. The system according to claim 2, wherein said detection means comprises:

holding means for holding a page address generated for a new write microinstruction before the current write microinstruction is executed; and comparing means for comparing the new page address held in said holding means with a page address generated for the currently executed write microinstruction, and generating a signal in accordance with the comparative result.

4. A system with a cache memory for executing a series of write microinstructions at high speed, comprising:

memory means, including a main memory and a cache memory, for storing data;

execution means for receiving a series of write microinstructions, supplying a virtual address including a page address and data to said memory means in response to the series of write microinstructions, thereby writing the data to said memory means, and generating a write instruction signal when the write microinstructions are executed;

miss-hit discrimination means for discriminating whether a page indicated by the virtual address output from said execution means is present in said cache memory and for generating a miss-hit signal representing a cache miss-hit when the page is not present;

detection means for detecting whether a current page, indicated by an access virtual address supplied by the execution means and associated with a currently executed write microinstruction, differs from the previous page indicated by the virtual address prior to the access virtual address, and generating the resulting detection signal; and wait means for causing said execution means to wait before executing the write microinstructions in response to the miss-hit signal and a positive detection signal indicating different page addresses, said wait means including:
- an instruction converter for generating a first signal indicative of an initial write microinstruction and a second signal indicative of subsequent write microinstructions in response to the write instruction signal supplied from said execution means;
- an AND circuit for outputting a signal output from the second signal and the detection signal,
- an OR circuit for outputting a signal output from said AND circuit and the first signal,
- a second AND circuit for outputting a signal output from said OR circuit and a miss-hit signal, and
- setting means for setting said execution means in a wait state in response to a signal output from said second AND circuit.

5. The system according to claim 4, wherein said detection means comprises:
- holding means for holding a page address generated for a new write microinstruction before the current write microinstruction is executed; and
- comparing means for comparing the new page address held in said holding means with a page address generated for the currently executed write microinstruction, and generating a signal in accordance with the comparative result.

6. A system with a cache memory for executing a series of write microinstructions at high speed, comprising:
- memory means, including a main memory and a cache memory, for storing data;
- execution means for receiving a series of write microinstructions, supplying a virtual address including a page address and data to said memory means in response to the series of write microinstructions, thereby writing the data to said memory means, and generating a write instruction signal when the write microinstructions are executed;
- miss-hit discrimination means for discriminating whether a page indicated by the virtual address output from said execution means is present in said cache memory and for generating a miss-hit signal representing a cache miss-hit when the page is not present;
- detection means for detecting whether a current page, indicated by an access virtual address supplied by the execution means and associated with a currently executed write microinstruction, differs from the previous page indicated by the virtual address prior to the access virtual address, and generating the resulting detection signal; and
- wait means for causing said execution means to wait before executing the write microinstructions in response to the miss-hit signal and a positive detection signal indicating different page addresses, said wait means including release means for releasing said execution means from the wait state,
- said release means including a first counter for counting the number of write microinstructions output from said execution means, a second counter for counting the number of signals representing the completion of write data processing said memory means, and comparing means for comparing counts of first and second counters and releasing said execution means from the wait state when the two counts correspond to each other.

7. The system according to claim 6, wherein said detection means comprises:
- holding means for holding a page address generated for a new write microinstruction before the current write microinstruction is executed; and
- comparing means for comparing the new page address held in said holding means with a page address generated for the currently executed write microinstruction, and generating a signal in accordance with the comparative result.

* * * * *